United States Patent [19]

Sprunk et al.

[11] Patent Number: 5,754,659

[45] Date of Patent: May 19, 1998

[54] GENERATION OF CRYPTOGRAPHIC SIGNATURES USING HASH KEYS

[75] Inventors: Eric Sprunk, Carlsbad; Paul Moroney, Olivenhain; Brant Candelore, Escondido, all of Calif.

[73] Assignee: General Instrument Corporation of Delaware, Chicago, Ill.

[21] Appl. No.: 577,922

[22] Filed: Dec. 22, 1995

[51] Int. Cl.[6] .................................................. H04L 9/30
[52] U.S. Cl. .................................................. 380/30; 380/25
[58] Field of Search ........................................ 380/25, 30

[56] References Cited

U.S. PATENT DOCUMENTS

| | | | |
|---|---|---|---|
| 4,881,264 | 11/1989 | Merkle | 380/25 |
| 5,005,200 | 4/1991 | Fischer | 380/30 |
| 5,432,852 | 7/1995 | Leighton et al. | 380/30 |
| 5,608,801 | 3/1997 | Aiello et al. | 380/30 |

OTHER PUBLICATIONS

R. Merkle, "One Way Hash Functions and DES," published in *Advances in Cryptology –CRYPTO '89*, printed by Springer–Verlag, 1990, pp. 428–446.

*Primary Examiner*—Salvatore Cangialosi
*Attorney, Agent, or Firm*—Barry R. Lipsitz

[57] ABSTRACT

A method and apparatus are provided for generating a digital signature that authenticates information of a plurality of different information groups. Information from each group is hashed to produce a separate hash key for each group authenticating the information in that group. Particular combinations of the hash keys are hashed together to produce at least one combined hash key. Each of the hash keys is ultimately combined in a predetermined order with all other hash keys via the combined hash keys to produce the digital signature in a manner that authenticates the information of all of the information groups. The digital signature is reproducible without access to all of the information groups authenticated thereby. Instead, information from a first information group is provided together with a set of hash keys and combined hash keys embodying authenticated information from the other groups. The hash key for the first information group is produced locally and combined with the other hash keys and/or combined hash keys in order to reproduce the digital signature.

25 Claims, 4 Drawing Sheets

GENERATION OF CRYPTOGRAPHIC SIGNATURES USING HASH KEYS

BACKGROUND OF THE INVENTION

The present invention relates to the generation of cryptographic signatures, and more particularly to methods and apparatus for generating and recovering cryptographic signatures that authenticate information from a plurality of different message groups without requiring the transmission of all of the authenticated information. The invention is applicable to any security scheme in which information is authenticated by a signature, including telecommunications applications wherein controlled access to various signals is required. Examples of such telecommunications applications include satellite and cable television systems, electronic mail systems, personal communicators, cellular telephones and the like. Applications outside of the telecommunications field include the secure storage and retrieval of digital data.

Although the present invention is described herein in connection with a secure broadcasting system for television signals, it is to be understood that the invention is applicable to virtually any application in which a cryptographic signature is provided from different groups of information. The scope of the present invention and claims is intended to cover all such applications.

For purposes of the present disclosure, a secure broadcasting system is defined as one in which a large number of services (e.g., television services) are broadcast over a common media to a large number of independent receivers having access to a controlled selection of the broadcast services. The individual services may comprise audio, video, data or any combination of these. An example of such a system is illustrated in FIG. 1.

Figure 1:
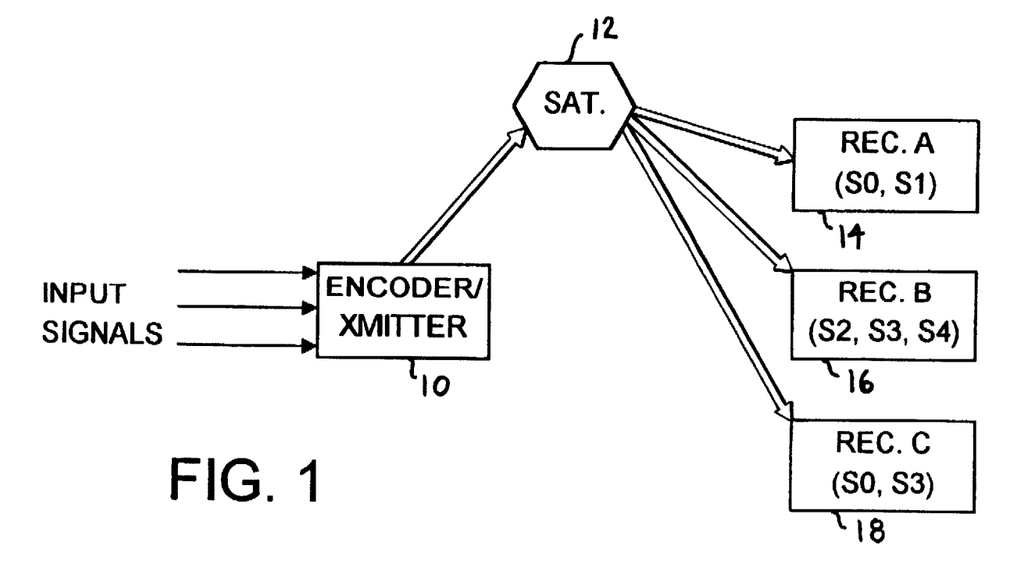
FIG. 1 is a diagrammatic illustration of a secure satellite broadcasting system.

In the secure broadcasting system of FIG. 1, input signals are encoded and transmitted by an encoder/transmitter 10 to a plurality of receivers 14, 16, 18 via a transmission channel. The transmission channel can comprise, for example, a satellite transmission channel having a satellite 12 which receives signals from the encoder/transmitter 10 and distributes them using conventional satellite communication techniques to the receivers 14, 16 and 18. In a satellite television embodiment, the input signals to the encoder/transmitter 10 will comprise television program signals, access control signals and various other data that is to be communicated to the receivers via the satellite distribution system. As will be appreciated by those skilled in the art, the receivers 14, 16, 18 can comprise any combination of commercial receivers and consumer receivers. Commercial receivers are those used by service providers, such as cable television operators, to receive signals from the satellite and redistribute them over a network such as a cable television system, typically for a fee. Consumer receivers are those found in the homes or offices of end users that receive the services, also typically for a fee.

Each data stream communicated over the secure broadcasting system has associated with it certain access requirements. Each receiver contains a decoder that has a set of authorization rights used to determine which data streams the receiver is entitled to access. The authorization rights of any decoder can be changed at any time by an encrypted message communicated over the system. Furthermore, by means of tiers which denote access requirements, the access requirements for each data stream may be changed by a new encrypted message. For each particular data stream, the encrypted message used to change the access requirements can also define the length of time that the access requirements exist.

Different programs or broadcast events available via the broadcasting system can be grouped together to form a service. A service must identify which authorization rights are required by a decoder to receive that service. A service may have one or more alternative access requirements. The service specifies a list of different access requirements, at least one of which must be valid for a specific decoder to access a specific service. The decoder determines validity by referencing its specified list of authorization rights. The term "tier" is used to generically denote either a specific access requirement or authorization right, depending on context.

A multitude of different access requirements for numerous different services are possible, and these correspond to a multiplicity of possible authorization rights held in decoders. These can be managed by the decoders through the use of an authorization rights vector. For example, the position of a bit within an authorization rights vector can identify a specific tier corresponding to a specific access requirement. The value of that bit determines whether or not the decoder has authorization rights to decode that particular service.

A set of authorization right and access requirement definitions comprises a group of information sometimes referred to as a "category." Each different category can be labeled with a unique category number. As indicated above, access requirements for any service can be changed at any time by an encrypted message. In a practical implementation, multiple categories with independent sets of access requirements and corresponding authorization right definitions are simultaneously supported for a single service. These multi-category access requirements must be defined as a set for all decoders that might access that service, yet, each category generally receives a single message specific thereto. Decoders assigned to that category only receive messages addressed to that category, and not the messages addressed to other categories with other sets of access requirement and authorization right definitions.

The messages sent to each category's decoders define the access requirements for that category. These access requirements must be delivered in a secure manner to prevent unauthorized reassignment of access requirements. In the past, such messages have been delivered encrypted by a secure key ("secret key") within the decoder. However, possession of the secure key would be sufficient to alter a message outside the decoder. A more secure scheme robust to attacks using this secure key is required.

By means of a key hierarchy, in which a plurality of different keys is used to securely communicate messages, delivery of different sets of access requirements for different categories can be combined cryptographically. In such a scheme, the keys that decipher the access requirement message must be delivered to each decoder independently through a secure message. The cryptographic combination of the access requirements for different categories is accomplished by a technique known as "hashing." In this process, all secure data from the message is cryptographically processed using a secure key to produce a shorter data block which is cryptographically dependent on both the secret key needed to decipher the access requirement message and the data contained in that message.

If the result of the hashing operation is used as a key in subsequent processing in the key hierarchy, then any external data tampering on the access requirements message will destroy the subsequent key hierarchy recovered by the decoder. Furthermore, if the hashing operation is performed in a secure area such as inside a secure processing component, security can be maintained even if the hashing key is known. More particularly, it would be computationally infeasible to tamper with the data outside of the secure area without altering the recovered hashing key.

One key used in securing satellite television broadcasts is known as a program key. A program key is associated with a given service for a particular period of time, on the order of hours. An access requirement match with an authorization right held by a decoder is required in addition to the program key for a decoder to gain access to the service.

Another key used in the key hierarchy of prior art satellite television systems is the "category key." All decoders in the same category share the same category key. The category key is changed on a periodic basis, such as monthly. A Category key is used to secure a single category, which in turn defines a single set of access requirements and authorization rights definitions.

Figure 2:
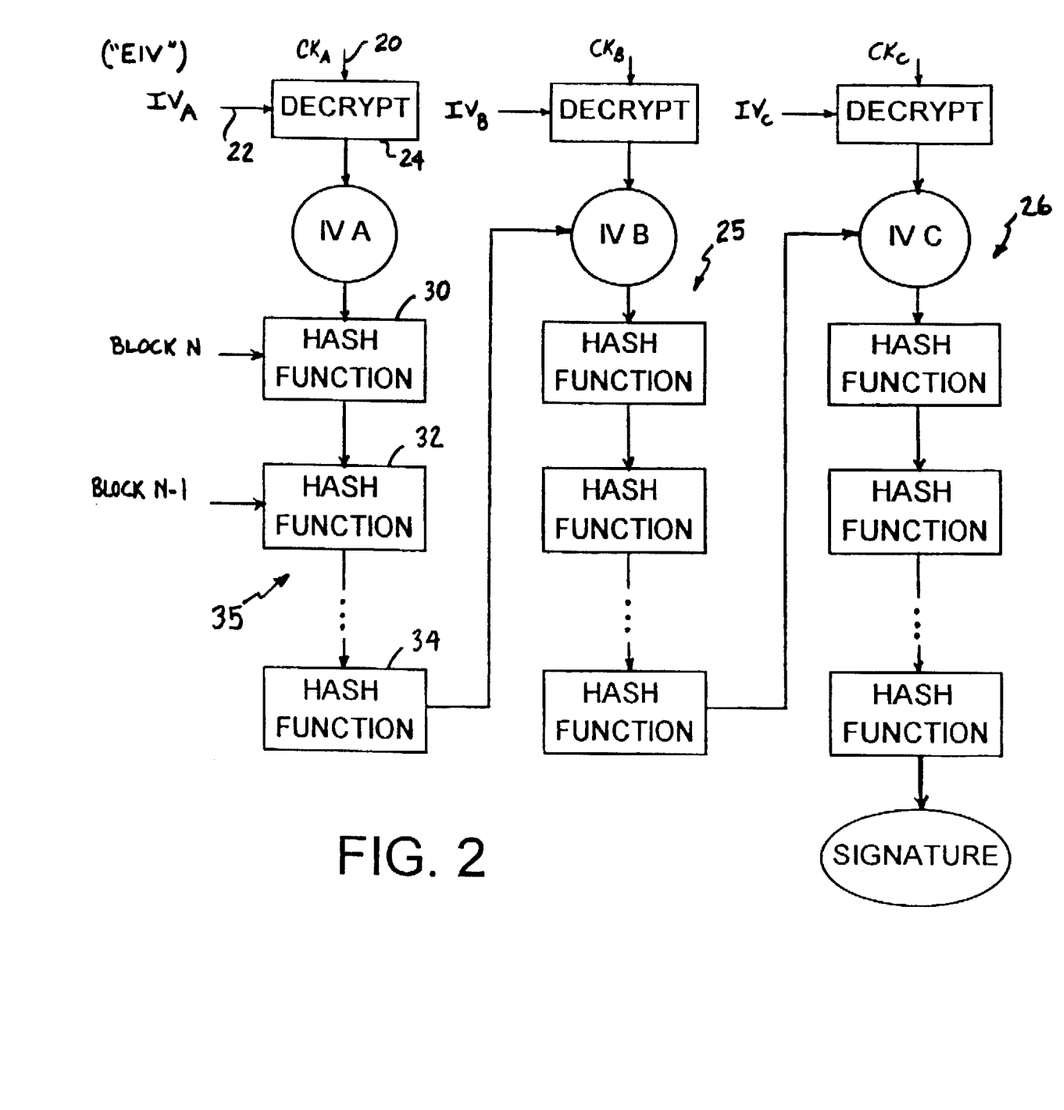
FIG. 2 is a block diagram of a prior art linear chain hashing scheme.

In the satellite television example, the program key authenticates various category information. In this context "authentication" refers to securing confidence that information has not been altered or replaced by some illicit party between the transmitter and the decoder. Most specifically, it is paramount to authenticate the access requirements, since a natural illicit manipulation is to reassign the access requirements of a service to match an authorization right held in a decoder that wishes to decode that service without authorization. In the past, the authentication has been provided using a linear hashing scheme as illustrated in FIG. 2. In this case, the term linear does not refer to the cryptographic or computational complexity definitions of the term, but instead refers to the topological or graphical processing of information as shown in the figure. In the linear hashing scheme shown in the figure, the category key is input to a decryption processor 24 via line 20. The cryptographic processor can comprise, for example, a data encryption standard (DES) function as well known in the art. The cryptographic processor generates an initialization vector or "IV" from the encrypted IV ("EIV") input via line 22.

It should be appreciated that although FIG. 2 illustrates the linear hashing provided at a decoder, the same hashing would be implemented at the encoder, in which case the derived program key would be identical, as is necessary.

The IV output from the cryptographic processor is input to a first hash function 30 that receives a block N of data to be authenticated. The resultant hashed output from hashing function 30 is dependent upon both the IV and the block of data, and is input to another hashing function 32 that receives another block of authentication data N−1. The process continues along a linear hashing chain generally designated 35 until a first block of the data to be authenticated is hashed by a hashing function 34 to provide an output for Category A. Since all three Categories in the figure allow access to the same service, Category A, B, and C information must be authenticated or hashed together. The result from Category A is therefore passed on to be hashed with Category B in a similar fashion generally designated 25. The result from Category B, which is dependent upon Category A at that point, is passed on for hashing with Category C information as generally designated by reference numeral 26. The result of the Category C hashing is therefore dependent upon the authenticated information of all three Categories, and comprises the actual Program Key.

As is evident from FIG. 2, the authentication data resulting from the hashing is derived from information taken from all categories in the chain. This traditional approach to hashing, using a linear chain of Categories A, B, and C, becomes very computationally intensive and time consuming as the number of blocks and Categories to be authenticated increases. This is a particular problem in a communication network where a large number of categories exist, demanding a large volume of data to be hashed by each Category to derive the Program Key common to all Categories. Each Category is burdened by the hashing necessary for all Categories with potential access to that service. Another burden comes from the need for each Category to possess all of the blocks to authenticate for all categories, which may mean decoder delays in acquiring messages for all categories, or wasted bandwidth due to duplicate transmission of information for multiple categories.

It would be advantageous to provide a more efficient hashing and authentication scheme, wherein each category is minimally burdened by the hashing of information blocks for other categories, and each category need only receive message information for itself, i.e., without including message information for the other categories. Such an apparatus and method should produce a cryptographic signature (e.g., a program key or the like) that authenticates all of the same information authenticated by the prior art linear hashing scheme, without the disadvantages of the linear hashing process.

The present invention provides a method and apparatus having the aforementioned and other advantages.

SUMMARY OF THE INVENTION

In accordance with the present invention, a method is provided for generating a digital signature that authenticates information of a plurality of different information groups. Information from each of the groups is hashed to produce a separate hash key for each group. Each hash key authenticates the information in its respective group. Particular combinations of the hash keys are then hashed together to produce at least one combined hash key. The digital signature is derived from (e.g., equal to or produced from) at least one combined hash key. The digital signature can be used, for example, as a program key in a subscription television access control system. The signature can also be used for any other purpose in which authenticated information is required for data security purposes.

The hashing step can comprise, for example, a bi-directional cryptographic process. It could alternatively comprise a trapdoor one way function.

The hash keys and combined hash keys can be hashed together according to any desired structure. For example, a binary tree structure may be used to minimize the number of computations that need to be made for each category to derive the Program Key common to all categories. In most implementations, the digital signature will be produced by hashing at least two combined hash keys together. At least one combined hash key may also be hashed with at least one hash key in order to produce the digital signature. Most implementations will probably hash a plurality of hash keys and combined hash keys together in a predetermined order in order to produce the digital signature.

Each of the hash keys is ultimately combined in a predetermined order with all of the other hash keys via the combined hash keys, thereby producing the digital signature in a manner that authenticates the information of all of the information groups. The predetermined order can be established by a network structure in which different hash keys and combined hash keys are input to various nodes of the network to affect the hashing steps. As noted above, the network structure can comprise a binary tree.

The hash key for each group can be produced by hashing the information from that group with a corresponding initialization vector for the group. In an illustrated embodiment, the digital signature is used as a cryptographic key in controlling access to a service communicated to a receiver.

A method is provided for recovering the cryptographic key for use in accessing the service at the receiver. This recovering method comprises the steps of communicating a first information group authenticated by the cryptographic key to the receiver. The first information group is then hashed with its corresponding initialization vector to obtain the hash key for that information group. Also communicated to the receiver are all of the hash keys and combined hash keys used in producing the cryptographic hash keys that do not authenticate the first information group and which are required by the receiver to recover the cryptographic key. The hash keys and combined hash keys communicated to the receiver as well as the hash key obtained for the first information group are hashed in accordance with the predetermined order, to reproduce the cryptographic key.

The hash keys and combined hash keys may be encrypted prior to communicating them to the receiver. For example, the hash keys and combined hash keys communicated to the receiver can be encrypted under at least one of a hash key and combined hash key derivable at the receiver, or by some other encryption key delivered to the receiver by a known mechanism.

A method is provided for reproducing the digital signature without access to all of the information groups authenticated therewith. In order to achieve this result, the authenticated information from at least one desired information group authenticated by the digital signature is obtained. The obtained information is hashed to reproduce the hash key for the desired information group. A collection of hash keys and combined hash keys is received. This collection of keys comprises those that are necessary to reproduce the digital signature in lieu of the actual information from which the hash keys and combined hash keys in the collection were produced. The reproduced hash key for the desired information group is hashed with the collection of hashed keys and combined hash keys in accordance with the predetermined order to reproduce the digital signature.

The predetermined order referred to can comprise a tree structure having branches into which hash keys and combined hash keys are input for hashing. The tree structure has a root from which the digital signature is output. Advantageously, the information groups can be prioritized in the tree structure by assigning the hash keys of those that are to be recovered with the least computation to branches nearest the root. The hash keys of the information groups that justify progressively more computation for recovery are assigned to branches that are progressively further from the root.

The information groups can provide information for controlling access to services provided on a communication network. In such an embodiment, the hash keys of information groups to be processed at an end user location in order to receive a service can be assigned to branches close to the root of the tree structure. Hash keys of information groups to be processed upstream of the end user location (e.g., at a satellite uplink or cable television headend) are assigned to branches further away from the root. In a more generalized embodiment that avoids frequent recalculation of hash keys for portions of the network, the hash keys of information groups that are likely to be modified more frequently are allocated to lower branches of the tree structure than the hash keys of information groups that are likely to be modified less frequently. The lower branches are closer to the root than higher branches of the tree structure.

Receiver apparatus is provided for recovering a digital signature that authenticates information from a plurality of information groups, without requiring the authenticated information from all of the information groups. The receiver apparatus comprises means for receiving the information for at least one of the information groups. The received information is hashed to generate at least one first hash key internal to a physically secure receiver. Means are provided for receiving at least one externally produced additional hash key used to authenticate information from at least one of the information groups that is not received by the receiver apparatus. Means are provided for combining the at least one first hash key with the at least one additional hash key according to a sequence from which the digital signature is produced. The combining means produce the digital signature.

In one embodiment, the digital signature is a cryptographic key used to encrypt a service communicated to the receiver apparatus. The at least one externally produced hash key can be received in an encrypted manner. In this case, the receiver apparatus will further comprise means for decrypting the additional hash key prior to combining it with the at least one first hash key.

The combining means of the receiver apparatus can comprise hash functions for combining the first and additional hash keys. In one embodiment, the receiver apparatus comprises a decoder for pay television signals.

DETAILED DESCRIPTION OF THE INVENTION

As described above, FIG. 1 illustrates a satellite communication system wherein input signals are encrypted and transmitted by a encoder/transmitter 10 to a satellite 12, for distribution to a plurality of receivers 14, 16 and 18. Each receiver has a subset of various authorization rights taken from the set of rights S0, S1, S2, S3, S4, ... SN. The authorization rights enable different receivers to access different information signals (e.g., television programs) distributed by satellite 12.

Figure 3:
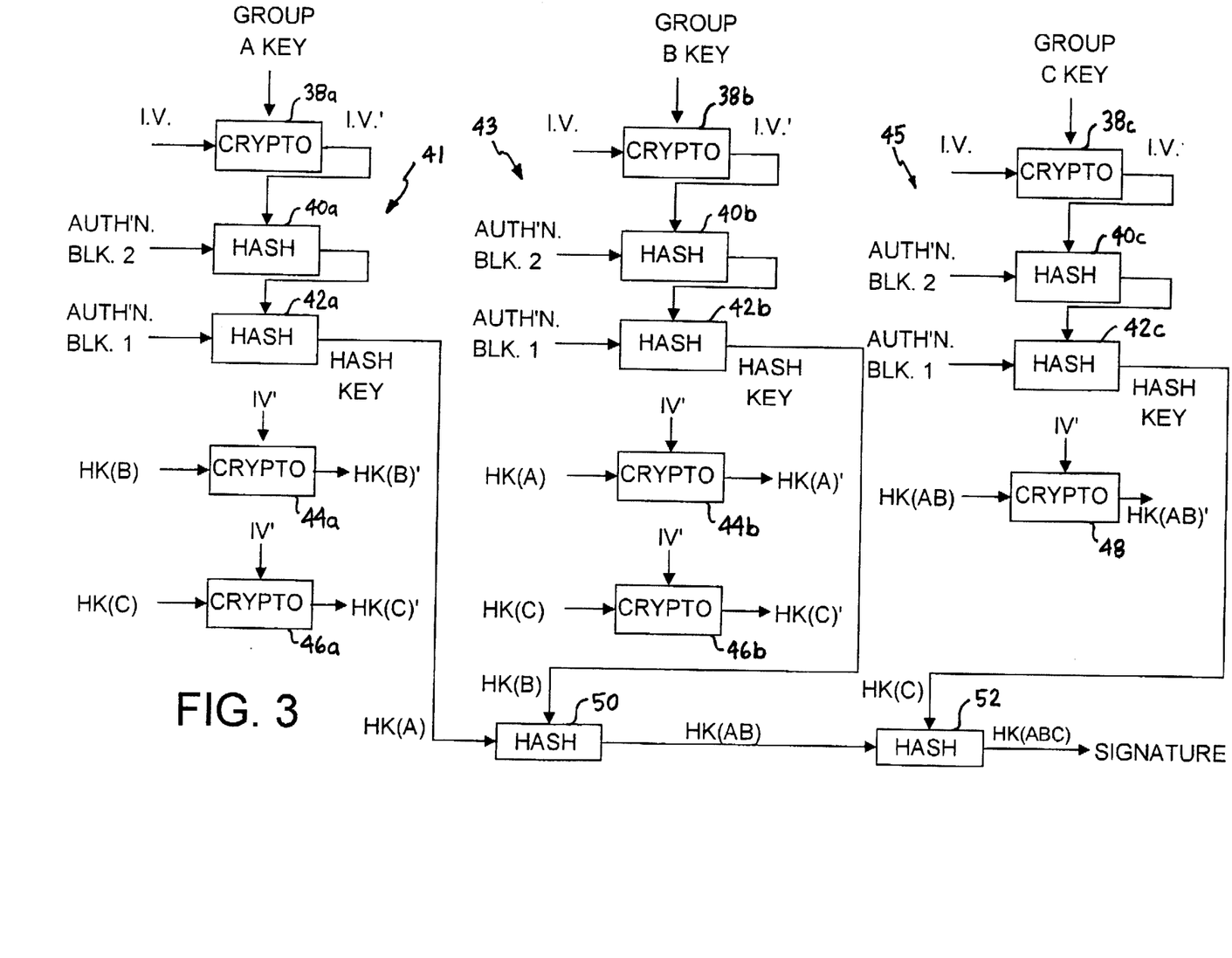
FIG. 3 is a block diagram of a hashing scheme in accordance with the present invention using a binary tree structure.

The present invention, which overcomes the computational complexity required with the prior art linear hashing scheme of FIG. 2, is illustrated in FIG. 3. It should be appreciated that the particular embodiment illustrated in FIG. 3 is an example only. In particular, FIG. 3 illustrates a simple binary tree chaining implementation in which information from three different information groups or categories (Group A, Group B and Group C) is authenticated by a digital signature. Other structures, such as higher order tree structures and other network structures can also be implemented in accordance with the invention. Typically, actual implementations will have many more branches and nodes than the example illustrated in FIG. 3.

Like linear chaining, the network structure of the present invention also links together all information from all blocks to be authenticated. The difference is that the linkage, instead of processing the messages for all Groups or categories in a straight line from beginning to end, combines pairs of data blocks or hash keys in a predetermined order. For example, in the example structure illustrated in FIG. 3, pairs of information groups are combined in a binary tree.

The information from each group to be authenticated can be broken into blocks. For example, for the Group A information processed by the branch generally designated 41, the information to be authenticated is presented in two blocks, authentication block 1 and authentication block 2. Authentication block 1 is hashed by hash function 42a and authentication block 2 is hashed by hash function 40a. Hash function 40a receives a cryptographic key (IV') from a cryptographic processor 38a that can comprise, for example, a well known DES function. The cryptographic processor receives an initialization vector (IV) and a unique key for information Group A in order to produce an encrypted (or decrypted or hashed) initialization vector for use as an input to hash function 40a.

Hash function 40a hashes the input received from cryptographic processor 38a with authentication block 2 of the information to be authenticated. The output is used as an input to hash function 42a. This hash function hashes the input received from hash function 40a with authentication block 1 of the information to be authenticated. The result is a hash key HK(A) for branch 41 that is input to another hash function 50. It is noted that although two hash functions 40a and 42a are illustrated, any number of hash functions can be provided depending on how many blocks the information of Group A is broken into for authentication. If the information to be authenticated is not broken into multiple blocks, then only one hash function would be provided in branch 41.

Hash function 50 receives a hash key from independent branch 43 in addition to the hash key received from branch 41 of the binary tree structure. Branch 43 produces its hash key HK(B) in the same manner that the hash key from branch 41 was produced. In particular, cryptographic processor 38b outputs to a first hash function 40b, which in turn outputs to a second hash function 42b for production of the branch 43 hash key.

It is noted that although branches 41 and 43 (as well as branch 45) are all shown in FIG. 3 as having the same structure, this is not required. Each independent branch can have any number of other branches feeding into it. Further, the particular hashing scheme used in each branch can be different. Thus, FIG. 3 illustrates a simplified binary tree structure for purposes of explaining the present invention. In practice, it is likely that much more complicated tree and network structures will be used, having many branches which ultimately flow to a single root for production of a digital signature.

Hash function 50 hashes the hash keys of branches 41 and 43 to produce a combined hash key HK(AB) for output to another hash function 52. The combined key output from hash function 50 is hashed with the hash key HK(C) output from branch 45 in order to produce the ultimate digital signature that authenticates all of the hashed information from Groups A, B and C. In FIG. 3, branch 45 is illustrated as being identical to branches 41 and 43. As explained above, however, this is for purposes of illustration only, and each branch may be entirely different. In branch 45 as illustrated, cryptographic processor 38c outputs to hash function 40c, which in turn outputs to hash function 42c for production of the ultimate hash key for the branch.

The operation of FIG. 3 described above corresponds to the processing that takes place when the access requirement messages for all three categories A, B, and C are created. As should be appreciated, the digital signature output from hash function 52 authenticates all of the Group A, Group B and Group C information. This is due to the fact that the hash key output from branch 41 authenticates all of the information from authentication blocks 1 and 2 of Group A; the hash key output from branch 43 authenticates all of the information from authentication blocks 1 and 2 of Group B; and the hash key provided by branch 45 authenticates all of the information from authentication blocks 1 and 2 of Group C. Thus, the combined hash key HK(AB) output from hash function 50 authenticates all of the information from Groups A and B. When this combined hash key is hashed with the hash key HK(C) provided by branch 45 (which authenticates the Group C information), the result is a digital signature HK(ABC) authenticating the information processed by all three branches.

The hash functions can comprise, for example, a bi-directional cryptographic process. Alternatively, they can comprise a trapdoor one way function. Such a trapdoor one way function can be defined as follows:

Let a function be described by the equation $c=f(p, ke, kd)$. (C could be ciphertext, p plaintext, ke the encrypt key and Kd the decrypt key). A trapdoor one way function (TDOWF) is one where:

1) given p and ke it is easy to calculate c;
2) given p and kd it is computationally infeasible to calculate c;
3) given c and kd it is easy to calculate p;
4) given p and kd it is computationally infeasible to calculate c;
5) given p and c and ke it is computationally infeasible to calculate kd; and
6) given p and c and kd it is computationally infeasible to calculate ke.

The values ke and kd are trapdoor values relative to each other, since only with them can certain calculations be done easily.

It should be appreciated that encoders or encrypters and decoders or decrypters must both possess the same cryptographic key to work together. The encoder uses this key to encrypt information, and the decoder uses it to decrypt this same information. Both encoder and decoder could therefore perform identical hash processing steps to derive the same key, meaning that they could be in the same Group A, B, or C. Alternatively, the encoder could be in one Group such as A, and the decoder in another Group B or C. The encoder and decoder would perform different processing steps to derive the resultant digital signature, but said signature would be the same for both.

The hash processing for all three categories A, B, and C must be performed when the messages for A, B, and C are created. Both encoder and decoder receive at least one of these messages to enable derivation of the common digital signature. For encoders and decoders, as opposed to the element that created the messages for the encoders and decoders, the processing is greatly simplified. The decoder will be discussed here, though it should be appreciated that the encoder functions similarly.

Each decoder is only required to recover information from some (e.g., one) of the groups. For example, the function of one particular decoder may be to decrypt received signals on the basis of access control information provided by Group A. In this instance, the Group A information will be provided to the decoder (either by transmission thereto, by prior storage therein, or by means of a removable data carrier or the like), but the Group B and Group C information will not be provided. Using the Group A information, the decoder will reproduce the Group A hash key using the same functions provided by branch 41 at the encoder. In particular, a cryptographic processor 38a will receive the initialization vector in order to provide one input required by hash function 40a. Authentication block 2 of the Group A information will be the other input to hash function 40a together with the key from cryptographic processor 38a in order to produce the input required by hash function 42a. This hash function receives authentication block 1 of the Group A information, hashes it with the key output from hash function 40a, and produces the branch 41 hash key HK(A) pertaining to the Group A information.

In addition to being provided with the actual Group A information, the decoder will also receive the hash keys and hash key combinations necessary to produce the digital signature. Thus, in addition to producing the hash key for branch 41 as described above, the decoder will receive the Group B hash key HK(B) and the Group C hash key HK(C) directly, without having to compute these keys.

In order to securely transmit the hash keys from the other branches to the decoder, these hash keys are encrypted. Thus, as shown in FIG. 3, a cryptographic processor 44a is provided for encrypting the hash key produced by branch 43 (HK(B)) under the IV produced by Group A cryptographic processor 38a. Similarly, a cryptographic processor 46a is provided for encrypting the hash key produced by branch 45 (HK(C)) under the IV produced by Group A cryptographic processor 38a. The decoder associated with Group A will include cryptographic processors corresponding to processors 44a and 46a to decrypt the received, encrypted hash keys HK(B)' and HK(C)'.

After decrypting hash keys HK(B) and HK(C), these keys will be used to recover the digital signature. More particularly, HK(B) will be hashed with the HK(A) produced at the decoder using hash function 50 to provide the combined hash key HK(AB). This combined hash key is input to hash function 52 together with received and decrypted hash key HK(C) to produce the digital signature.

For decoders (or encoders) associated with the Group B information, the hash key HK(B) will be produced locally. Hash keys HK(A) and HK(C) will be provided to the decoder in the access requirements message with authentication blocks 1 and 2, so that these hash keys do not have to be recreated at the decoder. Cryptographic processors 44b and 46b are provided to decrypt the hash keys from branches 41 and 45 at the decoder, since they are sent in an encrypted form.

For decoders (or encoders) associated with the Group C information, the hash key HK(C) will be derived locally using functions equivalent to cryptographic processor 38c, 40c and 42c. For the example illustrated in FIG. 3, only one additional key needs to be delivered to the decoder; namely, combined hash key HK(AB). As can be seen from FIG. 3, once the decoder for the Group C has locally derived hash key HK(C), all that is necessary to reproduce the digital signature using hash function 52 is the combined hash key HK(AB).

As illustrated by FIG. 3, the chaining methodology of the present invention saves substantial computation at the decoder or encoder when compared to the prior art linear hashing technique illustrated in FIG. 2. Instead of requiring all of the actual information authenticated by the digital signature as required in the prior art, the present invention only requires the information corresponding to the particular decoder or encoder to be delivered, together with the encrypted and already computed hash keys and hash key combinations for other branches of the hashing structure. In the event that information in one of the groups has changed, the decoder will only need to receive the hash key (or combined hash key(s)) associated with the changed information group and those hash keys closer to the root of the network structure. This represents a vast improvement over the prior art, in which a change of information in one group impacted all subsequent groups along the chain.

Figure 4:
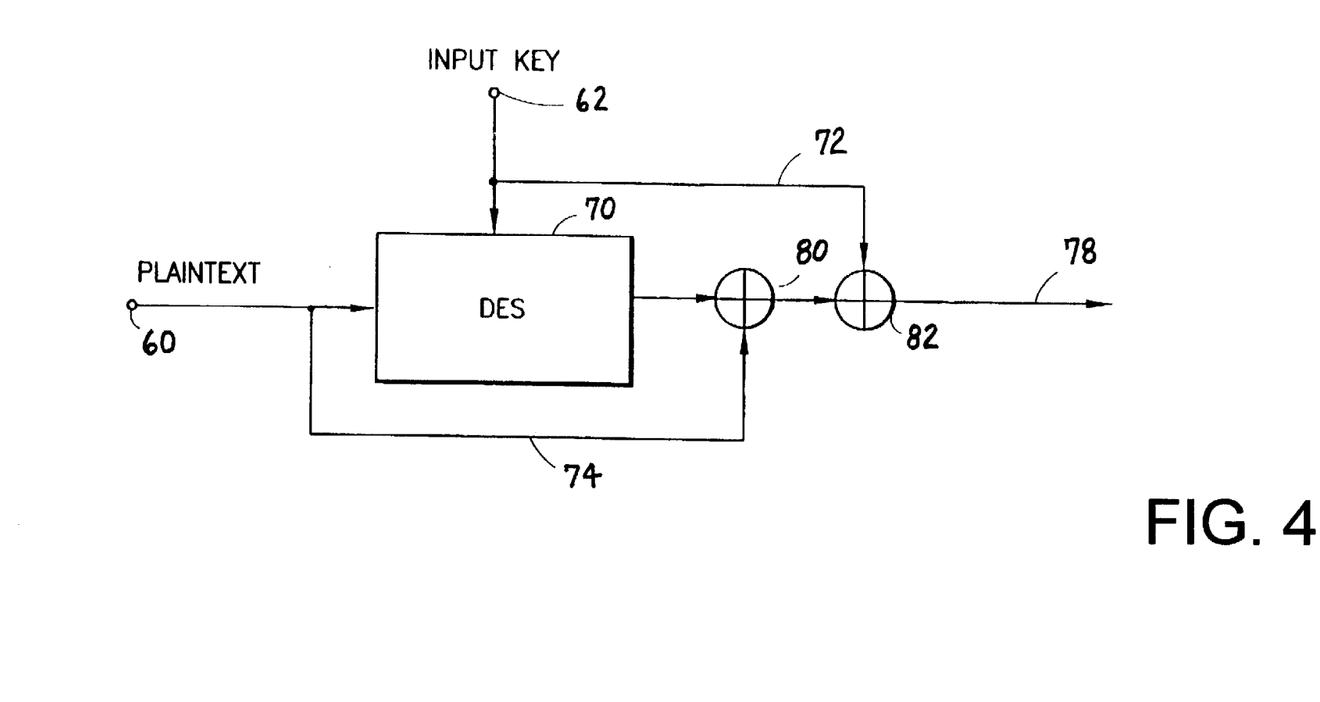
FIG. 4 is a block diagram illustrating a double feedforward hash function.

Any cryptographically secure hash functions) can be used to implement the present invention. As will be appreciated by those skilled in the art, some hash functions will be preferable over others due to their cryptographic integrity. An example of one hash function that can be used in accordance with the invention is the double feedforward (DFFH) hash function of FIG. 4.

In the DFFH function illustrated, plaintext is input via terminal 60 to a cryptographic processor (e.g., DES processor) 70. The plaintext is also fed forward to an exclusive OR gate (XOR) 80 via line 74. Processor 70 receives an input key via terminal 62. The input key is also fed forward via line 72 to an exclusive OR gate 82. Gate 80 exclusive OR's the cipher text output from processor 70 with the plaintext. The result is exclusively OR'd with the input key in gate 82, to provide the hashed output. If desired, the DFFH stage of FIG. 4 can be cascaded with other similar stages, as well known in the art.

When designing the network or tree structure over which the hash keys are computed, various steps can be taken to optimize the decoding process. For example, end user decoders (as opposed to commercial decoders) are generally relatively low cost products having a limited amount of computational power. Therefore, in order to reduce signal acquisition times at the end user decoders, it will be advantageous to assign hash keys of information groups to be processed by such decoders to branches of the tree or network structure closest to the root. The hash keys of information groups to be processed upstream of the end user location (e.g., by commercial decoders at a satellite uplink or cable television headend) are advantageously assigned to branches further away from the root.

Similarly, for information groups that are likely to be modified more frequently, it is advantageous to assign their hash keys to lower branches of the tree or network structure. This implies that the hash keys of information groups that are likely to be modified less frequently are assigned to higher branches on the tree or network structure. As a result, information groups that are likely to be frequently modified will not require the need for as much recomputation along the tree or network structure as information groups that are less likely to be modified.

Other considerations may lead to other optimization techniques for the network or tree structure. These include both balanced and unbalanced trees. At the present time, it is believed that a binary tree structure is optimal for use in providing access control to satellite television signals. In a binary tree structure, two branches are provided per node. The goal is to reduce processing time and maximize the number of data blocks that can be authenticated.

It should now be appreciated that the present invention provides a method and apparatus for generating and recovering digital signatures which authenticate information of a plurality of different information groups. Information from each group is hashed to provide a hash key for the group, and combinations of the hash keys are hashed in a predetermined order in order to ultimately provide a common digital signature. The digital signature can be reproduced at a decoder without access to all of the information groups authenticated thereby. This is accomplished by providing the authenticated information from at least one of the groups associated with the decoder to locally derive the hash key(s) for the associated group(s). Instead of locally deriving the hash keys and/or hash key combinations associated with other information groups, these items are delivered to the decoder from the encoder in an encrypted manner.

Although the invention has been described in connection with a specific exemplary embodiment, it should be appreciated that numerous adaptations and modifications may be made thereto, without departing from the spirit and scope of the invention as set forth in the claims.

We claim:

1. A method for generating a digital signature that authenticates information of a plurality of different information groups, comprising the steps of:

hashing information from each of said groups to produce a separate hash key for each group, each hash key authenticating the information in its respective group;

hashing combinations of said hash keys together to produce at least one combined hash key; and deriving said digital signature from said at least one combined hash key;

wherein said digital signature is independently reproducible from (i) a hash key derived from the authenticated information of one of said groups and (ii) a set of hash keys and combined hash key(s) already produced by said hashing steps for other of said groups, without requiring the authenticated information from all of said groups.

2. A method in accordance with claim 1 wherein said hashing step comprises a bi-directional cryptographic process.

3. A method in accordance with claim 1 wherein said hashing step comprises a trapdoor one way function.

4. A method in accordance with claim 1 wherein said digital signature is produced by hashing at least two combined hash keys together.

5. A method in accordance with claim 1 wherein said digital signature is produced by hashing at least one combined hash key with at least one hash key.

6. A method in accordance with claim 5 wherein a plurality of hash keys and combined hash keys are hashed together in a predetermined order to produce said digital signature.

7. A method in accordance with claim 1 wherein each of said hash keys is ultimately combined in a predetermined order with all other hash keys via said combined hash keys, thereby producing said digital signature in a manner that authenticates the information of said information groups.

8. A method in accordance with claim 7 wherein said digital signature is used as a cryptographic key in controlling access to a service communicated to a receiver.

9. A method in accordance with claim 1 wherein said hash keys are produced by authenticating information of different information groups.

10. A method in accordance with claim 9 wherein said digital signature is used to determine whether or not information in any of the different information groups has changed.

11. A method for recovering the digital signature of claim 7 for use in accessing a service at a receiver, comprising the steps of:

hashing a first information group at said receiver to obtain the hash key for that group;

communicating to said receiver all other hash keys and combined hash keys used in producing said digital signature which are required by said receiver to recover said digital signature; and hashing the hash keys and combined hash keys communicated to the receiver as well as the hash key obtained for the first information group, all in accordance with said predetermined order, to reproduce said digital signature.

12. A method in accordance with claim 11 comprising the further step of encrypting said hash keys and combined hash keys prior to communicating them to said receiver.

13. A method in accordance with claim 12 wherein said hash keys and combined hash keys communicated to said receiver are encrypted under at least one of a hash key and combined hash key derivable at said receiver.

14. A method for reproducing the digital signature of claim 7 without access to all of the information groups authenticated thereby, comprising the steps of:

obtaining the authenticated information from at least one desired information group authenticated by said digital signature;

hashing the obtained information to reproduce the hash key for said desired information group;

receiving a collection of hash keys and combined hash keys which are necessary to reproduce said digital signature in lieu of the actual information from which the hash keys and combined hash keys in said collection were produced; and hashing the reproduced hash key for said desired information group with said collection of hash keys and combined hash keys in accordance with said predetermined order to reproduce said digital signature.

15. A method in accordance with claim 14 wherein:

said predetermined order comprises a tree structure having branches into which hash keys and combined hash keys are input for hashing and having a root from which said digital signature is output; and said information groups are prioritized in said tree structure by assigning the hash keys of those that are to be recovered with the least computation to branches nearest said root and assigning the hash keys of those that justify progressively more computation for recovery to branches that are progressively further from said root.

16. A method in accordance with claim 15 wherein:

said information groups provide information for controlling access to services provided on a communication network; and the hash keys of information groups to be processed at an end user location in order to receive a service are assigned to branches close to said root, whereas the hash keys of information groups to be processed upstream of said end user location are assigned to branches further away from said root.

17. A method in accordance with claim 15 wherein the hash keys of information groups that are likely to be modified more frequently are allocated to lower branches of said tree structure than the hash keys of information groups that are likely to be modified less frequently, said lower branches being closer to said root than higher branches of said tree structure.

18. A method in accordance with claim 1 wherein each of said hash keys is ultimately combined in a predetermined order established by a network structure with all other hash keys via said combined hash keys, thereby producing said digital signature in a manner that authenticates the information of all of said information groups.

19. A method in accordance with claim 18 wherein said network structure comprises a binary tree.

20. Receiver apparatus for recovering a digital signature that authenticates information from a plurality of information groups, without requiring the authenticated information from all of said information groups, said apparatus comprising:

- means for receiving the information from at least one of said information groups;
- means for hashing the received information to internally generate at least one first hash key;
- means for receiving at least one externally produced additional hash key used to authenticate information from at least one of said information groups that is not received by said apparatus; and
- means for cryptographically combining said at least one first hash key with said at least one additional hash key according to a sequence from which said digital signature was produced;
- said combining means producing said digital resignature.

21. Apparatus in accordance with claim 20 wherein said digital signature is a cryptographic key used to encrypt a service communicated to said receiver apparatus.

22. Apparatus in accordance with claim 20 wherein said at least one externally produced additional hash key is received encrypted, said apparatus further comprising means for decrypting said additional hash key prior to combining it with said at least one first hash key.

23. Apparatus in accordance with claim 20 wherein said combining means comprise hash functions for combining said first and additional hash keys.

24. Apparatus in accordance with claim 21 wherein said receiver apparatus comprises a decoder for pay television signals.

25. Receiver apparatus for recovering a previously produced digital signature from a plurality of hash keys, said apparatus comprising:

- means for internally generating at least one first hash key from authenticated information intended to be received by said receiver;
- means for receiving at least one externally produced additional hash key derived from other authenticated information not intended to be received by said receiver; and
- means for cryptographically combining said at least one first hash key with said at least one additional hash key according to a sequence from which said digital signature was previously produced;
- said combining means recovering said digital signature without requiring reception of said other authenticated information.

* * * * *